United States Patent Office 3,357,841
Patented Dec. 12, 1967

3,357,841
CORROSION INHIBITING COMPOSITION
AND METHOD
Nallan C. S. Chari and Gus S. Scarvelis, Toledo, Ohio, assignors to Owens-Illinois, Inc., a corporation of Ohio
No Drawing. Filed Dec. 7, 1964, Ser. No. 416,586
14 Claims. (Cl. 106—14)

ABSTRACT OF THE DISCLOSURE

Composition for inhibiting corrosion of metal surfaces which is comprised of an alkali metal nitrite and N-alkyl-beta-amino butyric amide of the formula

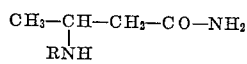

wherein R is an alkyl having from 6 to 18 carbon atoms, such as N-dodecyl-beta-amine butyric amide. The composition is applied to wrappers or containers for metal parts, for example, by forming a starch or protein emulsion of the composition and coating or impregnating the wrapper or container with the emulsion.

---

The present invention relates to a composition and method for inhibiting the corrosion of metallic substances. More particularly, it relates to novel compositions comprising alkali metal nitrites and N-alkyl-beta-amino butyric amides and their use as corrosion inhibitors.

The problem of controlling the corrosion of metals, such as steel, particularly when in contact with water, has presented a widespread and major industrial problem. The magnitude and importance of this problem has resulted in considerable research and investigation for the purpose of preventing corrosion or decreasing the corrosion rate not only with respect to steel, but also to copper, brass, and aluminum which are also subject to corrosive attack but to a lesser degree.

Numerous inorganic and organic chemicals, such as the chromates, phosphates, nitrites, and amines have been employed for the purpose of minimizing the corrosion of metals. However, it has now been discovered that novel compositions comprising alkali metal nitrites and N-alkyl-beta-amino butyric amides having the formula

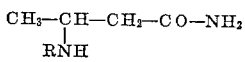

wherein R is an alkyl having a carbon chain length ranging between 6 and 18 carbon atoms, are excellent corrosion inhibitors and are particualrly useful in protecting ferrous metals from the corrosive attacks of water whether in the liquid or the vapor form.

Accordingly, it is therefore an object of this invention to provide a new corrosion inhibiting composition.

Another object of this invention is to provide a corrosion inhibiting composition for use under aqueous oxidizing conditions whether in liquid or vapor form.

A still further object of this invention is to provide an improved method for inhibiting the corrosion of metals, especially steel.

According to this invention, the unique corrosion inhibiting composition comprises an alkali metal nitrite in combination with an N-alkyl-beta-amino butyric amide. These compositions are usually prepared as aqueous solutions and particularly as starch or protein emulsions. Although various alkali metal nitrites may be employed, sodium nitrite is preferred. Other suitable nitrites include potassium and lithium nitrites.

The foregoing N-alkyl-beta-amino butyric amides can be prepared by treating crotonic acid with hydrochloric acid. The resulting β-monochlorobutyric acid is then reacted with a primary alkyl amide to form an amino salt of N-alkyl-beta-amino butyric acid. The latter is then reacted with POCl₃ to form the corresponding butyric chloride which is thereafter aminated to form the N-alkyl-beta-amino butyric amide.

According to the present invention, it is contemplated that the compositions comprising alkali metal nitrites and alkyl substituted amino butyric amides be used as vapor phase corrosion inhibitor coatings on containers or wrappings for metal objects, such as steel, which are subject to corrosive attack. Such application to the packaging industry is illustrated by the following examples.

Example 1.—Protein emulsion 100 grams of soya protein were added to 450 grams of water and stirred well. The batch was agitated thoroughly allowing it to soak for 15 minutes. Then 11 gm. of ammonia (26° Be.) was added along with 50 gm. of water with continued agitation and the temperature of the batch was raised to 135° F. The batch was stirred until the soya protein dissolved completely. In a separate beaker 200 gm. of N-dodecyl-beta-amino butyric amide was melted and the molten mass was added to the above protein solution. The batch was stirred well and to this was added a solution of sodium nitrite containing 300 gm. of sodium nitrite dissolved in 300 gm. of water at 100° F. This coating was applied onto the surface of the linerboard by means of a coating rod to a coating weight of about 6 lbs. of solids per thousand square feet.

Example 2.—Starch emulsion

Procedure of Example 1 was repeated except the soya protein was replaced by 450 grams of starch.

To determine the effectiveness of the novel compositions of this invention as inhibitors for corrosion of ferrous metals by water the following testing procedure in which a control was used was conducted. Into each of three one pint jars was poured one hundred ml. of water. Two bronze screens were prepared in the form of a cup shape and placed in each jar, one facing down and one facing upwards. The coated liners of Examples 1 and 2 above were cut into dimensions of 4½ inches by 4½ inches and placed in each of the upper cups of two of the pint jars while the steel specimens were kept on the surface of the liner. The blank uncoated liner was used in the same manner in a third jar as a control. All the liners were of the 42 lb. grade. The specimens were cold rolled steel rods ½" in diameter and ¾" long. Prior to the testing, the specimens were polished on all surfaces, cleaned with acetone and dried well. The jars were tightly sealed and kept in a cold chamber maintained at 40° F. for a period of 24 hours. The jars were then transferred to a hot chamber maintained at 150° F. for a period of 48 hours. At the completion of the experiments, the jars were allowed to cool to room temperature and the degree of corrosion of the specimens observed.

The results of this corrosion test showed that the control specimen corroded extremely deep and was covered not only with dark brown rust on all surfaces but there was considerable pitting. However, in the case of the two specimens exposed in the coated liners, no spots of rust could be observed.

In addition to bar coating of the linerboard, other coating methods can be employed such as curtain coating, spray coating, knife coating and the like.

In general, an N-alkyl-beta-amino butyric amide of the following formula

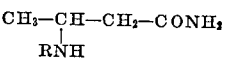

herein R is an alkyl having a carbon chain ranging between 6 to 18 carbon atoms or mixtures thereof can be effectively employed as corrosion inhibitors. Thus, a protein emulsion similar to Example 1 above but with the following mixture of N-alkyl-beta-amino butyric amides substituted for the N-dodecyl-beta-amino butyric amide gave similar excellent test results.

*Example 3.—Protein emulsions*

N-alkyl-beta-amino butyric amide: Grams
Octyl ............................................. 9
Decyl ............................................. 8
Dodecyl .......................................... 52
Tetradecyl ....................................... 19
Hexadecyl ........................................ 10
Octodecyl ........................................ 2

It has also been observed that the ratio of the butyric amide to the nitrite should be in the range of 3:1 to 1:3.

In addition, it has been noted that the amide and nitrite can be applied by a "two-coat" method with the same excellent results with respect to inhibiting corrosion. For example, linerboard was first coated with a 40% solution of sodium nitrite in water and then dried in an oven such that the coating weight of the sodium nitrite was 2 lbs./MSF. Thereafter, a molten mixture of the amides given in Example 3 above was coated on top of the sodium nitrite so that the coating weight of the amides was 4 lbs./MSF. The above sodium nitrite can be applied in the form of a spray or roll-coater application. The amide or amides can be applied not only as a hot melt coating but by means of a waxer, which coating methods are well known in the art.

Various other modifications of the present invention will be apparent to those skilled in the art without departing from the scope thereof. Thus other components such as lubricants and wetting agents may be incorporated into the components of this invention. Accordingly, it is to be noted that the specific embodiments set forth above are intended to illustrate the invention and not to limit its scope as otherwise disclosed herein.

We claim:
1. A corrosion inhibiting composition which consists essentially of about 1:2 to 3:1 parts, respectively, of an alkali metal nitrite and a member selected from the group consisting of an N-alkyl-beta-amino butyric amide of the formula

$$CH_3-CH-CH_2-C{\overset{O}{\underset{NH_2}{\diagdown}}}$$
$$\phantom{CH_3-}RNH$$

wherein R is an alkyl having from 6 to 18 carbon atoms and mixtures thereof.

2. A corrosion inhibiting composition which consists essentially of a starch or protein emulsion containing about 1:2 to 3:1 parts, respectively, of an alkali metal nitrite and an N-alkyl-beta-amino butyric amide of the formula $$CH_3-CH-CH_2-C{\overset{O}{\underset{NH_2}{\diagdown}}}$$
$$\phantom{CH_3-}RNH$$

wherein R is an alkyl having from 6 to 18 carbon atoms.

3. The composition of claim 2 in which the emulsion is a starch emulsion.

4. The composition of claim 2 in which the emulsion is a protein emulsion.

5. The composition of claim 1 in which the nitrite is sodium nitrite.

6. The method of preventing the corrosion of metallic surfaces which comprises contacting said surfaces with a corrosion inhibiting composition which consists essentially of about 1:2 to 3:1 parts, respectively, of an alkali metal nitrite and a member selected from the group consisting of an N-alkyl-beta-amino butyric amide of the formula $$CH_3-CH-CH_2-C{\overset{O}{\underset{NH_2}{\diagdown}}}$$
$$\phantom{CH_3-}RNH$$

wherein R is an alkyl having from 6 to 18 carbon atoms and mixtures thereof.

7. A wrapping for metal objects, said wrapping having corrosion-inhibiting qualities and containing about 1:2 to 3:1 parts, respectively, of an alkali-metal nitrite and a member selected from the group consisting of an N-alkyl-beta-amino butyric amide of the formula $$CH_3-CH-CH_2-C{\overset{O}{\underset{NH_2}{\diagdown}}}$$
$$\phantom{CH_3-}RNH$$

wherein R is an alkyl having from 6 to 18 carbon atoms and mixtures thereof.

8. A linerboard having corrosion-inhibiting properties and containing a starch or protein emulsion having about 1:2 to 3:1 parts, respectively, of an alkali metal nitrite and an N-alkyl-beta-amino butyric amide of the formula $$CH_3-CH-CH_2-C{\overset{O}{\underset{NH_2}{\diagdown}}}$$
$$\phantom{CH_3-}RNH$$

wherein R is an alkyl having from 6 to 18 carbon atoms.

9. The linerboard of claim 7 in which the emulsion is a starch emulsion.

10. The linerboard of claim 7 in which the emulsion is a protein emulsion.

11. The linerboard of claim 7 in which the nitrite is sodium nitrite.

12. A linerboard having corrosion inhibiting properties and containing about 1:2 to 3:1 parts, respectively, of an alkali-metal nitrite and a member selected from the group consisting of an N-alkyl-beta-amino butyric amide of the formula $$CH_3-CH-CH_2-C{\overset{O}{\underset{NH_2}{\diagdown}}}$$
$$\phantom{CH_3-}RNH$$

wherein R is an alkyl having from 6 to 18 carbon atoms and mixtures thereof.

13. The method as defined in claim 6 wherein said composition is a starch or protein emulsion.

14. A container for metal objects, said container having corrosion-inhibiting qualities and coated with about 1:2 to 3:1 parts, respectively, of an alkali metal nitrite and a member selected from the group consisting of an N-alkyl-beta-amino butyric amide of the formula $$CH_3-CH-CH_2-C{\overset{O}{\underset{NH_2}{\diagdown}}}$$
$$\phantom{CH_3-}RNH$$

wherein R is an alkyl having from 6 to 18 carbon atoms and mixtures thereof.

References Cited

UNITED STATES PATENTS

| | | | |
|---|---|---|---|
| 2,357,276 | 8/1944 | Wachter | 106—14 |
| 2,521,311 | 9/1950 | Schwoegler et al. | 21—2.5 |
| 2,534,201 | 12/1950 | Hutter. | |
| 2,717,843 | 9/1955 | Wachter et al. | 106—14 XR |

FOREIGN PATENTS 728,634  4/1955  Great Britain.

ALEXANDER H. BRODMERKEL, *Primary Examiner.*

L. B. HAYES, *Assistant Examiner.*